United States Patent [19]

DeSimone

[11] Patent Number: 5,559,926
[45] Date of Patent: Sep. 24, 1996

[54] SPEECH RECOGNITION TRAINING USING BIO-SIGNALS

[75] Inventor: Joseph DeSimone, Bradley Beach, N.J.

[73] Assignee: Lucent Technologies Inc., Murray Hill, N.J.

[21] Appl. No.: 171,585

[22] Filed: Dec. 22, 1993

[51] Int. Cl.⁶ ........................................ G10L 5/06
[52] U.S. Cl. .................. 395/2.52; 395/2.4; 395/2.43
[58] Field of Search ...................... 395/2.16, 2.4, 395/2.43, 2.45, 2.46, 2.48, 2.50, 2.52, 2.64

[56] References Cited

U.S. PATENT DOCUMENTS

| | | | |
|---|---|---|---|
| 4,139,732 | 2/1979 | Fourcin | 395/2.85 |
| 4,390,756 | 6/1983 | Hoffmann et al. | 179/107 |
| 4,718,096 | 1/1988 | Meisel | 381/43 |
| 4,894,777 | 1/1990 | Negishi et al. | 364/419 |
| 4,901,354 | 2/1990 | Gollmar et al. | 381/110 |
| 5,092,343 | 3/1992 | Spitzer et al. | 128/733 |
| 5,171,930 | 12/1992 | Teaney | 84/725 |

OTHER PUBLICATIONS

Edward A. Martin, et al., "Dynamic Adaptation of Hidden Markov Models for Robust Isolated-Word Speech Recognition", ICASSP '88, Sep. 1988 pp. 52–54.

*Primary Examiner*—Allen R. MacDonald
*Assistant Examiner*—Thomas J. Onka
*Attorney, Agent, or Firm*—Christopher N. Malvone

[57] ABSTRACT

A bio-signal is monitored while a speech recognition system is trained to recognize a word or utterance. An utterance is identified for retraining when the bio-signal is above an upper threshold or below a lower threshold while the recognition system is being trained to recognize the utterance.

36 Claims, 2 Drawing Sheets

SPEECH RECOGNITION TRAINING USING BIO-SIGNALS

CROSS REFERENCE TO RELATED APPLICATIONS

Related subject matter is disclosed in the applications filed concurrently herewith and assigned to the same assignee hereof entitled "Speech Recognition Using Bio-Signals" Ser. No. 08/171,586 and "Improved Speech Recognition Using Bio-Signals" Ser. No. 08/171,584.

TECHNICAL FIELD

The present invention relates to speech recognition; more specifically, training speech recognition systems.

DESCRIPTION OF THE PRIOR ART

In the past, speech recognition systems were trained by simply speaking an utterance to be recognized into a microphone while the recognition system was in a training/tutorial mode. Such a system is illustrated in FIG. 1. FIG. 1 illustrates a personal computer or PC 10 with a display 12, keyboard 14, and an audio/sound card 16 that is inserted into a card slot within PC 10. Microphone 18 is used to provide verbal inputs to audio card 16. Audio card 16 can be a card sold under the trade name (SPEECH COMMANDER) by from Verbex Voice Systems, Inc. In addition to using audio card 16, PC 10 runs software packages sold under the trade names (LISTEN) by Verbex Voice Systems, Inc., and (WINDOWS) by Microsoft Corporation to provide verbal control of PC 10's actions using speech recognition. Systems such as these recognize commands approximately 80%–95% of the time. Unfortunately, failing to recognize a word or utterance 20%-percentage of the time results in user frustration, computer errors and decreased productivity.

SUMMARY OF THE INVENTION

An embodiment of the present invention makes use of bio-signals when training the speech recognition system to improve the recognition rate during usage. When training a speech recognition system to recognize an utterance, that utterance is later retrained if a bio-signal exceeds a normal range while the training is taking place. For example, a signal indicative of the impedance between two points on the speaker's skin is monitored while training a speech recognition system. If the signal varies outside of a normal range while training the recognition system to recognize a word or utterance, the recognition system is retrained to recognize the word or utterance when the signal is within the normal range.

DETAILED DESCRIPTION

Figure 2:
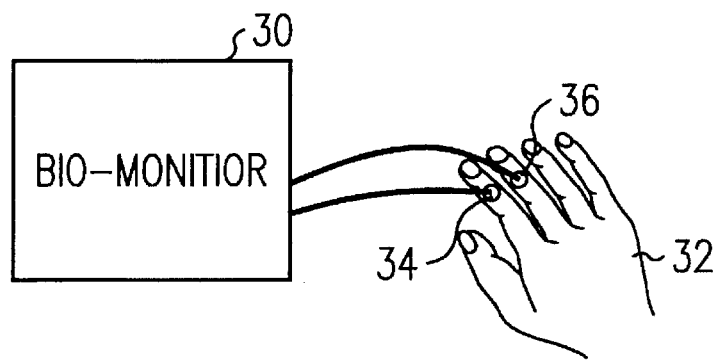
FIG. 2 illustrates a bio-monitor that monitors the impedance between two points on a user's skin.

In reference to FIG. 2, an embodiment of the present invention uses bio-monitor 30 to measure the impedance between two points on the surface of user 32's skin. This is carried out using contact 34 which is attached to one of the user's fingers and contact 36 which is attached to another of the user's fingers. A bio-monitor such as a bio-feedback monitor model number 63-664 sold by Radio Shack, which is a division of Tandy Corporation, under the trade name (MICRONATA® BIOFEEDBACK MONITOR) may be used. It is also possible to attach the contacts to other positions on the user's skin.

Figure 1:
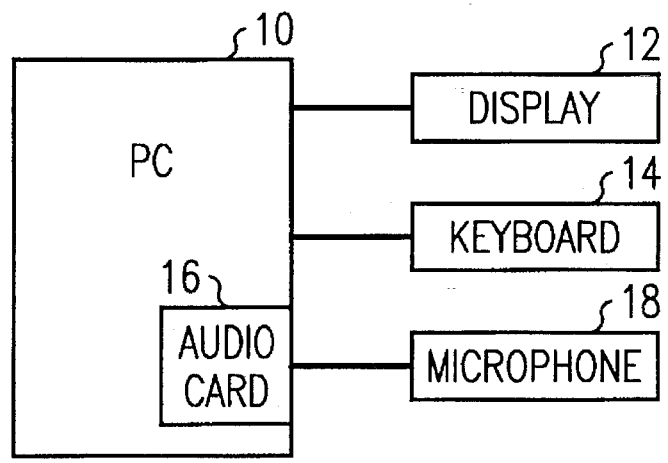
FIG. 1 illustrates a personal computer with an audio card and microphone.

When training the speech recognition system of FIG. 1, the user speaks into microphone 18 while the speech recognition system is in a training mode. While speaking the training words or utterances into microphone 18, bio-monitor 30 is used to measure the impedance between two positions on the user's skin. When bio-monitor 30 indicates that the impedance is outside of a normal range, the words being trained at that time are identified for retraining. The recognizer is retrained to recognize the identified words when the impedance between points 34 and 36 is in a more typical or normal range. A normal range may be determined using an average of the bio-monitor's output over a period of time while the user is in an unexcited state. By training in this fashion, the accuracy of the recognition system is increased.

When bio-monitor 30 is the above-referenced monitor available from Radio Shack, a bio-signal in the form of a clicking sound is produced. The amount of time between clicks relates to the impedance between points 36 and 34. When the user is in a more excited or anxious state, the impedance between points 34 and 36 is decreased and a higher frequency sound is produced by decreasing the time between clicks. When the user is in a less excited state, the impedance between points 36 and 34 is increased and a lower frequency sound is produced by increasing the time between clicks. When an abnormally high or low frequency sound is produced, the words that were trained during that period are identified for retraining. The retraining is executed when the frequency of sounds from bio-monitor 30 is in a normal range.

Figure 3:
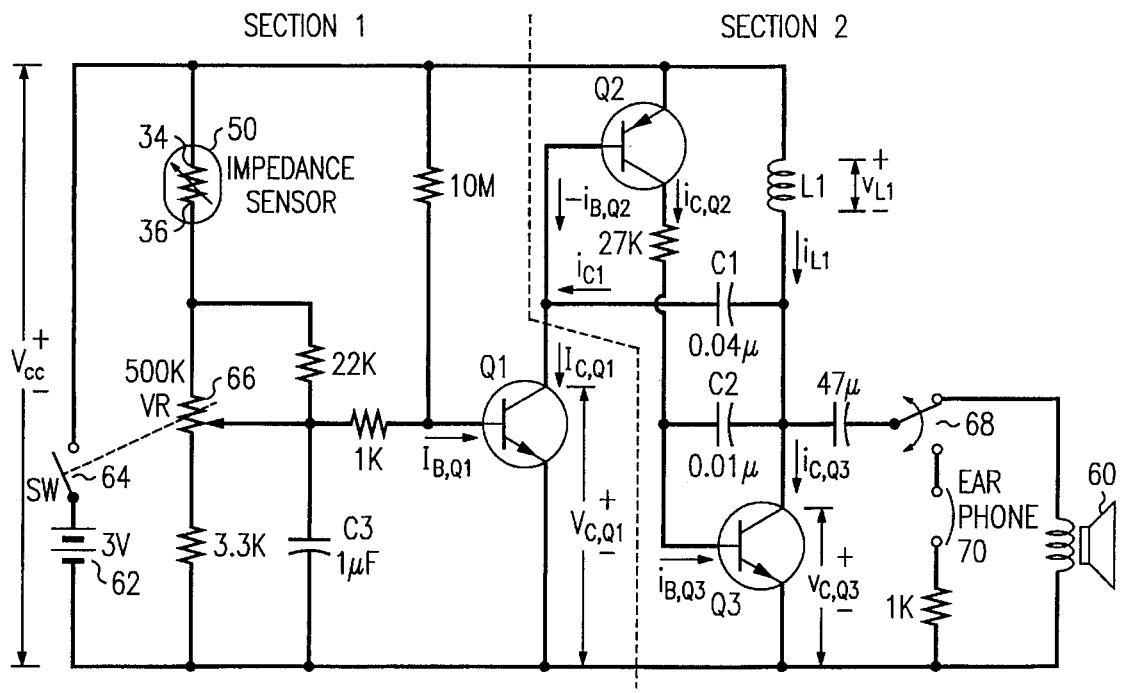
FIG. 3 illustrates a circuit within the bio-monitor.
Figure 4:
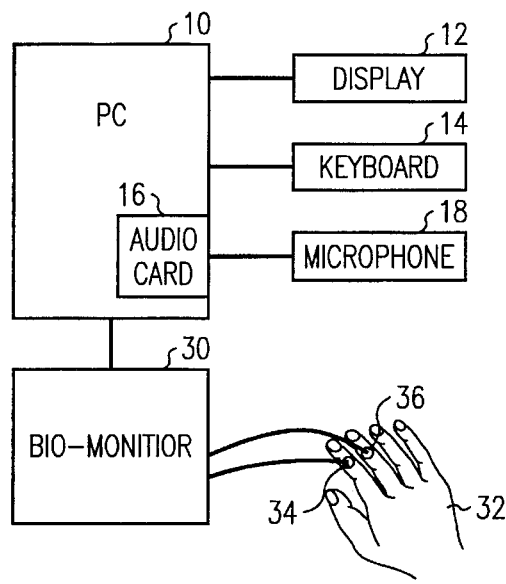
FIG. 4 illustrates a speech recognition system in which a bio-signal is utilized.

Bio-monitor 30 contains the circuit of FIG. 3 which produces a bio-signal in the form of the sound that indicates the impedance between points 34 and 36. The circuit consists of two sections. The first section is used to sense the impedance between contacts 34 and 36, and the second section acts as an oscillator to produce a sound, where the frequency of oscillation is controlled by the first section.

The first section controls the collector current $I_{c,Q1}$ and voltage $V_{c,Q1}$ of transistor Q1 based on the impedance between contacts 34 and 36. In this embodiment, impedance sensor 50 is simply contacts 34 and 36 positioned on the speaker's skin. Since the impedance between contacts 34 and 36 changes relatively slowly in comparison to the oscillation frequency of section 2, the collector current $I_{c,Q1}$ and voltage $V_{c,Q1}$ are virtually constant as far as section 2 is concerned. The capacitor C3 further stabilizes these currents and voltages.

Section 2 acts as an oscillator. The reactive components, L1 and C1, turn transistor Q3 on and off to produce an oscillation. When the power is first turned on, $I_{c,Q1}$ turns on Q2 by drawing base current $I_{b,Q2}$. Similarly, $I_{c,Q2}$ turns on transistor Q3 by providing base current $I_{b,Q3}$. Initially there is no current through inductor L1. When Q3 is turned on, the voltage Vcc less a small saturated transistor voltage $V_{ce,Q3}$, is applied across L1. As a result, the current $I_{L1}$ increases in accordance with $L\ dI_{L1}/dt = V_{L1}$. As current $I_{L1}$ increases, current $I_{c1}$ through capacitor C1 increases. Increasing the current $I_{c1}$ reduces the base current $I_{B,Q2}$ from transistor Q2 because current $I_{c,Q1}$ is virtually constant. This in turn reduces currents $I_{c,Q2}$, $I_{b,Q3}$ and $I_{c,Q3}$. As a result, more of current $I_{L1}$ passes through capacitor C1 and further reduces current $I_{c,Q3}$. This feedback causes transistor Q3 to be turned off. Eventually, capacitor C1 is fully charged and currents $I_{L1}$ and $I_{c1}$ drop to zero, and thereby permit current $I_{c,Q1}$ to once again draw base current $I_{b,Q2}$ and turn on transistors Q2 and Q3 which restarts the oscillation cycle.

Current $I_{c,Q1}$, which depends on the impedance between contacts 34 and 36, controls the frequency and duty cycle of the output signal. As the impedance between points 34 and 36 decreases, the pitch or frequency of the signal produced at speaker 60 rises, and as the impedance between points 34 and 36 increases, the pitch or frequency of the signal heard at speaker 60 decreases.

The circuit is powered by three-volt battery source 62 which is connected to the circuit via switch 64. Also included is variable resistor 66 which is used to set an operating point for the circuit. It is desirable to set variable resistor 66 at a position that is approximately in the middle of its range of adjustability. The circuit then varies from this operating point as described earlier based on the impedance between points 34 and 36. The circuit also includes switch 68 and earphone jack 70. When a connector is inserted into ear phone jack 70, switch 68 provides the circuit's output to ear phone jack 70 rather than speaker 60.

It is also possible to monitor bio-signals other than a signal indicative of the impedance between two points on a user's skin. Signals indicative of autonomic activity may be used as bio-signals. When a signal indicative of autonomic activity exceeds a normal range during training, the words or utterances that were being trained at that time should be retrained when the signal is in a normal range. Signals indicative of autonomic activity such as blood pressure, pulse rate, brain wave or other electrical activity, pupil size, skin temperature, transparency or reflectivity to a particular electromagnetic wavelength or other signals indicative of the user's emotional state may be used.

A normal range may be established, for example, by measuring the bio-signal over a period of several minutes while allowing the user to remain undisturbed. Setting an upper threshold above that value and a lower threshold below that value establishes the boundaries of a normal range. If the bio-signal extends above the upper threshold or below the lower threshold, while a word is being trained, that word should be retrained when the bio-signal is between the upper and lower thresholds. It is also possible to use just an upper threshold or just a lower threshold. These thresholds can be set based on a certain percentage above or below the normal value. A percentage such as approximately 50% was found to give good performance with regard to measuring impedance between two points on the user's skin.

It is also possible to set the thresholds based on a high reading, average reading and low reading of the bio-signal. The high and low readings may be obtained by monitoring the bio-signal of interest over an extended period of time such as eight hours. The average bio-signal reading may be calculated by averaging the high and low bio-signal readings, or it may be calculated by averaging many bio-signal readings. After determining the high, average and low bio-signal readings, the upper threshold may be set equal to the average reading plus approximately 25% of the difference between the high reading and average reading. Likewise, the lower threshold may be set equal to the average reading minus approximately 25% of the difference between the average reading and the low reading.

What is claimed:

1. A method for training a speech recognition system to recognize a user's utterance, comprising the steps of:
   providing an utterance to the speech recognition system while in a training mode;
   monitoring a bio-signal derived from the user; and
   using said bio-signal to identify said utterance for retraining.

2. The method of claim 1, wherein said step of using said bio-signal comprises re-providing said utterance for training when said bio-signal is within a normal range.

3. The method of claim 1, wherein said step of using said bio-signal comprises re-providing said utterance for training when said bio-signal is below an upper threshold.

4. The method of claim 1, wherein said step of using said bio-signal comprises re-providing said utterance for training when said bio-signal is above a lower threshold.

5. The method of claim 1, wherein said step of using said bio-signal comprises re-providing said utterance for training when said bio-signal exceeds a threshold.

6. The method of claim 1, wherein said step of using said bio-signal comprises identifying said utterance when said bio-signal is outside a normal range.

7. The method of claim 1, wherein said step of using said bio-signal comprises identifying said utterance when said bio-signal is above an upper threshold.

8. The method of claim 1, wherein said step of using said bio-signal comprises identifying said utterance when said bio-signal is below a lower threshold.

9. The method of claim 1, wherein said step of using said bio-signal comprises identifying said utterance when said bio-signal crosses a threshold.

10. The method of claim 1, wherein said bio-signal is related to the user's emotional state.

11. The method of claim wherein said bio-signal is related to impedance.

12. The method of claim 1, wherein said bio-signal is related to pulse.

13. The method of claim 1, wherein said bio-signal is related to blood pressure.

14. The method of claim 1, wherein said bio-signal is related to electrical activity.

15. The method of claim 1, wherein said bio-signal is related to pupil size.

16. The method of claim 1, wherein said bio-signal is related to temperature.

17. The method of claim 1, wherein said bio-signal is related to skin transparency.

18. The method of claim 1, wherein said bio-signal is related to reflectivity.

19. A method for training a speech recognition system to recognize a user's utterance, comprising the steps of:
   providing an utterance to the speech recognition system while in a training mode;
   monitoring a bio-signal derived from the user, said bio-signal being related to autonomic activity; and
   using said bio-signal to identify said utterance for retraining.

20. The method of claim 19, wherein said step of using said bio-signal comprises re-providing said utterance for retraining when said bio-signal is within a normal range.

21. The method of claim 19, wherein said step of using said bio-signal comprises re-providing said utterance for retraining when said bio-signal is below an upper threshold.

22. The method of claim 19, wherein said step of using said bio-signal comprises re-providing said utterance for retraining when said bio-signal is above a lower threshold.

23. The method of claim 19, wherein said step of using said bio-signal comprises re-providing said utterance for retraining when said bio-signal exceeds a threshold.

24. The method of claim 19, wherein said step of using said bio-signal comprises identifying said utterance when said bio-signal is outside a normal range.

25. The method of claim 19, wherein said step of using said bio-signal comprises identifying said utterance when said bio-signal is above an upper threshold.

26. The method of claim 19, wherein said step of using said bio-signal comprises identifying said utterance when said bio-signal is below a lower threshold.

27. The method of claim 19, wherein said step of using said bio-signal comprises identifying said utterance when said bio-signal crosses a threshold.

28. The method of claim 19, wherein said bio-signal is related to the user's emotional state.

29. The method of claim 19, wherein said bio-signal is related to impedance.

30. The method of claim 19, wherein said bio-signal is related to pulse.

31. The method of claim 19, wherein said bio-signal is related to blood pressure.

32. The method of claim 19, wherein said bio-signal is related to electrical activity.

33. The method of claim 19, wherein said bio-signal is related to pupil size.

34. The method of claim 19, wherein said bio-signal is related to temperature.

35. The method of claim 19, wherein said bio-signal is related to skin transparency.

36. The method of claim 19, wherein said bio-signal is related to reflectivity.

* * * * *